United States Patent
Landis et al.

(10) Patent No.: US 12,096,725 B2
(45) Date of Patent: Sep. 24, 2024

(54) GEL-BASED HORTICULTURAL SUBSTRATE

(71) Applicant: VELOCIGRO INC., Monrovia, CA (US)

(72) Inventors: Geoffrey C. Landis, Commerce, CA (US); April Dawson, Commerce, CA (US); Morris Gasmer, Commerce, CA (US)

(73) Assignee: VELOCIGRO INC., Monrovia, CA (US)

( * ) Notice: Subject to any disclaimer, the term of this patent is extended or adjusted under 35 U.S.C. 154(b) by 0 days.

(21) Appl. No.: 17/328,871

(22) Filed: May 24, 2021

(65) Prior Publication Data

US 2021/0360883 A1 Nov. 25, 2021

Related U.S. Application Data

(60) Provisional application No. 63/029,211, filed on May 22, 2020.

(51) Int. Cl.
*A01G 24/46* (2018.01)
*A01G 24/10* (2018.01)
*A01G 24/22* (2018.01)

(52) U.S. Cl.
CPC ............. *A01G 24/46* (2018.02); *A01G 24/10* (2018.02); *A01G 24/22* (2018.02)

(58) Field of Classification Search
CPC ......... A01G 24/46; A01G 24/10; A01G 24/22
USPC ............................................................. 47/59
See application file for complete search history.

(56) References Cited

U.S. PATENT DOCUMENTS

| 2017/0172082 A1* | 6/2017 | Weiss ................. A01G 31/02 |
| 2019/0037783 A1 | 2/2019 | Banister |

FOREIGN PATENT DOCUMENTS

| JP | 09047154 A | * | 2/1997 |
| JP | 09205869 | * | 8/1997 |
| JP | 09205869 A | * | 8/1997 |
| KR | 10-1848302 B1 | | 4/2018 |
| KR | 10-1881420 B1 | | 8/2018 |

OTHER PUBLICATIONS

Thomas the role of activated charcoal in plant tissue culture. Biotechnology Advances 26 (2008) 618-631.*
https://www.plantcelltechnology.com/blog/agar-vs-gellan-gum-which-to-choose. Nov. 5, 2020.*
Coelho et al. Impact of chitosan on plant tissue culture:recent applications Plant Cell, Tissue and Organ Culture (2022) 148:1-13.*
Katiyar et al. Chitosan as a promising natural compound to enhance potential physiological responses in plant: a review Ind J. Plant Physiol. (Jan.-Mar. 2015) 20(1):1-9.*
California Coastal Commission 2012 retrieved on Jan. 30, 2023 at https://www.scv-habitatagency.org/DocumentCenter/View/353/Wildlife-Friendly_Products?bidId=, pp. 1-6 (Year: 2012).*
JPH09205869A English patent translation, 5 pp. (Year: 2023).*
Prizao et al. Activated charcoal and graphite for the micropropagation of *Cattelya bicolor* Lindl. and a orchid double-hybrid 'BLC Pastoral Innocence', Acta Scientiarum Agronomy Maringa v. 34, n. 2, 157-161, 2012. (Year: 2012).*
Sabadini et al. Synthesis and characterization of gellan gum: chitosan biohydrogels for soil humidity control and fertilizer release, Cellulose (2015) 22:2045-2054. (Year: 2015).*
JP09047154A Espacenet English translation 2024, 6 pp. (Year: 2024).*
International Search Report on related PCT Application No. PCT/US2021/033935 from International Searching Authority (KIPO) dated Sep. 8, 2021.
Written Opinion on related PCT Application No. PCT Application No. PCT/US2021/033935 from International Searching Authority (KIPO) dated Sep. 8, 2021.

* cited by examiner

*Primary Examiner* — June Hwu
(74) *Attorney, Agent, or Firm* — Barnes & Thornburg LLP (57) ABSTRACT

A vertical substrate comprised of a gel on a wire or mesh scaffolding may be used for growth of plants. The gel may include two polysaccharide components, with a second of the two components providing increased rigidity and/or adherence to the scaffolding. Plants may be grown, including from seed, in the substrate.

14 Claims, 8 Drawing Sheets

GEL-BASED HORTICULTURAL SUBSTRATE

CROSS-REFERENCE TO RELATED APPLICATION

This application claims the benefit of the filing date of U.S. Provisional Patent Application No. 63/029,211, filed May 22, 2020, the disclosure of which is incorporated by reference herein.

FIELD OF THE INVENTION

The present invention relates generally to substrates for use in growing crops, and more particularly to a gel-based substrate for germination and/or growth of plants and crops.

BACKGROUND OF THE INVENTION

Plants and crops are commonly grown in soil or similar growth medium, as well as in aqueous environments. Soil environments may vary in their suitability for plant and crop growth, and may be less than suitable for use as a bulk medium for other than horizontal applications. Aqueous environments such as hydroponic environments may also be less than suitable for other than horizontal applications, as well as generally possibly requiring use of structures to hold individual plants in the hydroponic environment. Aqueous environments such as aeroponic environment may allow for vertical applications, but the structures for holding individual plants may still result in additional costs, and may require significant cleaning.

BRIEF SUMMARY OF THE INVENTION

Some embodiments provide a reinforced gel substrate, and plants growing in gel substrate or plant seeds for germination within the gel substrate. In some embodiments the reinforced gel substrate comprises a gel and a scaffolding for the gel. In some embodiments the scaffolding is a mesh substantially encapsulated within the gel. In some embodiments the mesh is a wire mesh. In some embodiments the substrate is in the form of a planar slab. In some embodiments the gel of the planar slab and mesh encapsulated by the gel of the planar slab comprise the reinforced gel substrate In some embodiments the gel includes a first polysaccharide and a second polysaccharide. In some embodiments the first polysaccharide is a gellan gum. In some embodiments the first polysaccharide is GELRITE™ (available from RPI Research Products International, IL). In some embodiments the second polysaccharide is chitosan. In some embodiments the gel includes approximately 1% GELRITE™ and 0.0075% chitosan by weight. In some embodiments the gel includes approximately 1% GELRITE™ and 0.0008% chitosan by weight. In some embodiments the gel includes approximately 0.2% to 3% GELRITE™ and approximately 0.0007% to 0.3% chitosan by weight.

In some embodiments the mesh has openings between 0.26 inches (0.66 cm) and 3.12 inches (7.93 cm), inclusive, in at least two perpendicular directions. In some embodiments the mesh is a wire mesh. In some embodiments the mesh includes openings between 4 and 50 times a width of wires in the mesh. In some embodiments the wire mesh includes a space between wires of 0.26 inches (0.66 cm) and 3.12 inches (7.93 cm), inclusive. In some embodiments the mesh is comprised of a metal. In some embodiments the mesh is comprised of a plastic. In some embodiments the mesh is comprised of a synthetic material. In some embodiments the mesh is comprised of a natural material. In some embodiments the substrate is substantially planar. In some embodiments the substrate has depth of between 0.5 inches (1.27 cm) and 3 inches (and 7.62 cm). In some embodiments the substrate has a width between 2 feet and 4 feet. In some embodiments the substrate has a width of 3 feet. In some embodiments the substrate has a width of 29 inches. In some embodiments the substrate has a length between 5 feet and 9 feet. In some embodiments the substrate has a width of 7 feet. In some embodiments the mesh comprises plastic-coated wire.

In some embodiments the plant seeds are approximately ⅛ inch (0.32 cm) from a first planar surface of the planar substrate. In some embodiments root of the plants growing in the substrate extend from a second planar surface of the planar substrate.

In some embodiments the planar substrate is held vertically. In some embodiments the planar substrate is held vertically with the first side of the planar substrate exposed at least periodically to a light source and the second side of the planar substrate exposed to a mist environment.

These and other aspects of the invention are more fully comprehended upon review of this disclosure.

DETAILED DESCRIPTION

Figure 1:
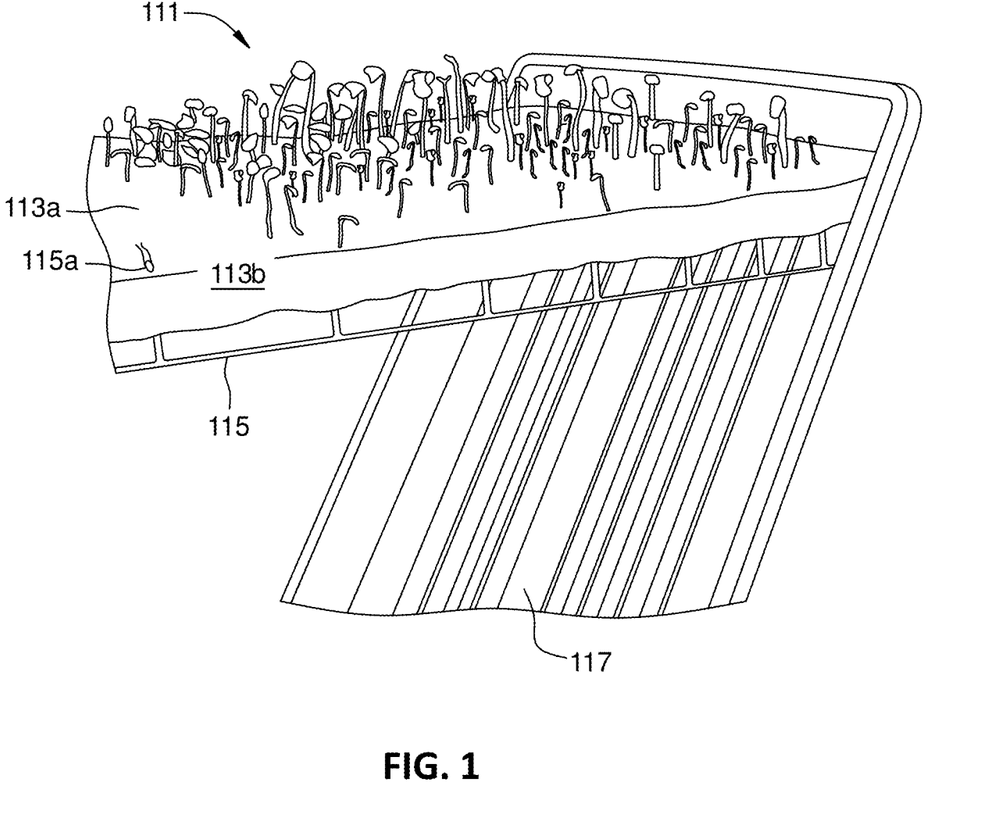
FIG. 1 shows a perspective top side view of plants growing in a reinforced gel substrate in accordance with aspects of the invention.

FIG. 1 shows a perspective top side view of plants 111 growing in a reinforced gel substrate 113 in accordance with aspects of the invention. The substrate comprises a substantially planar slab, with a top surface 113a and a side surface 113b visible in FIG. 1. In most embodiments the top surface has a substantially larger area than the side surface. Plants growing in the slab are shown as having a stem extending out of a top surface of the substrate and a canopy extending above the substrate.

A portion of a wire mesh 115 is visible, with the portion of the wire mesh extending out of a bottom surface of the substrate, about one side of the substrate. In some embodiments the bottom surface is substantially parallel to the top surface, with side surfaces connecting the top surface and the bottom surface. One of the wires 115a of the wire mesh is also partially visible within the planar slab. The wire mesh is generally within the slab, with the mesh generally about mid-way between top surface and the bottom surface.

The mesh provides a scaffolding for a gel, with the mesh and gel together forming a reinforced gel substrate. In some embodiments the gel comprises a first polysaccharide and a second polysaccharide. In some embodiments the first polysaccharide is an exopolysaccharide. In some embodiments the first polysaccharide is a gellan gum. In some embodiments the first polysaccharide is GELRITE™ (available from RPI Research Products International, IL). In some embodiments the second polysaccharide is chitosan. In some embodiments the chitosan provides additional rigidity to the substrate, for example to allow the substrate to be mounted with its top and bottom surfaces arranged vertically. In some embodiments the gel substrate includes approximately 1% GELRITE™ and 0.0008% chitosan by weight. In some embodiments the gel substrate includes approximately 0.2% to 3% GELRITE™ and approximately 0.0007% to 0.3% chitosan by weight. Generally, the GELRITE™ and chitosan are added to one or more solutions. In some embodiments the one or more solutions comprise water and/or fertigation solution. In some embodiments the fertigation solution is slightly acidic, and/or includes trace amounts of one, some, or all of Sodium Nitrate or other nitrogen source, potassium, copper, zinc, manganese, iron, boron, calcium, and/or magnesium. In some embodiments the solution has a conductivity between 1.0 and 1.4, inclusive, milliSiemens per centimeter. In some embodiments the solution includes added calcium and/or magnesium cations so as to have seed conductivity. In some embodiments the solution includes calcium and/or magnesium cations to provide divalent ions to bind to carboxylic acids of the GELRITE™.

In some embodiments the substrate may be formed by dissolving GELRITE™ into a fertigation solution, dissolving chitosan in a second solution, and heating the dissolved GELRITE™ solution and mixing in the dissolved chitosan solution. In some embodiments cations may be added to the combined solution. In some embodiments activated charcoal may be added to the combined solution. The combined solution may be poured into trays, with a wire mesh in the trays, and allowed to gel.

In some embodiments the substrate may be formed as follows.

1. Sol-1: GELRITE™ Solution. Dissolve 40-g of GELRITE™ (RPI Research Products International, IL) into 4-L cold fertigation water. In some embodiments the fertigation water contains 850 ppm nitrate, 148 ppm calcium 259 ppm potassium, 39 ppm magnesium, 224 ppm sulfate, 0.11 ppm copper, 2.12 ppm zinc, 0.4 ppm manganese, 3.33 ppm iron, 0.31 ppm boron, and 0.05 ppm molybdenum.) Stir (400-500 rpm) the GELRITE™ until it is completely dissolved/hydrated in the solution (<30-min). The pH and EC may be checked, preferably the pH is 5.6 and the EC is 1.4 milliSiemens per centimeter.

2. Sol-2: Chitosan Solution. Added 35-mg of Chitosan (300-mg of Chitosan in some embodiments) to 200-mL of fertigation solution with stirring. Then add 50-mL of Ethanol to the solution. Add 0.05-mL of HNO3 and heat the solution to 90° C. Preferably the chitosan polymer has completely dissolved into the solution.

3. Sol-3: Non-Cation GELRITE™/Chitosan mixture. After the GELRITE™ is completely hydrated, heat the solution until the gel is completely dissolved (to boiling). There are believed to be enough divalent ions in the fertigation solution to bind to the carboxylic acids in the polymer chain that contributes to a stronger gel strength as it cools and gels below 50° C. While the GELRITE™ solution is stirring (400-500 rpm, preferably no splashing) slowly add Sol-2 to the Sol-3. Preferably the two solutions are mixed well. Preferably there little or no build up of chitosan on the propeller or spindle of the stirrer. Preferably any foam that forms is mixed back into the solution. Preferably the solution is mixed for at least 30 minutes.

4. Sol-4: Cation Activated GELRITE™/Chitosan mixture. Add small 200-mg aliquots of Ca(OH)2 into Sol-3 until the pH paper is show a pH of 6-7. Then add 5.6 g of Calcium Chloride, or, preferably, 7-g of Tetra COR-CLEAR® (available from Tetra Chemicals, TX). And let the solution mix for a while, for example 15 minutes. In some embodiments then slowly begin to add 50-g of fine activated charcoal to the mixture. In some embodiments phytohormones may also be added.

5. Pour the mixture into one or more trays, to provide one or more reinforced gel substrates. In some embodiments the mixture is the Cation Activated GELRITE™/Chitosan mixture, without the activated charcoal. In some embodiments the mixture is the Cation Activated GELRITE™/Chitosan mixture, with the activated charcoal. The trays may be for example black plastic trays. Allow the mixture to cool. The trays may have wire mesh already in the screens, or the wire mesh is placed in the tray when the tray has received half the mixture to be received. In some embodiments the wire mesh is substantially planar, with off-plane offsets on one side so that the body of the mesh may sit offset from a bottom of the tray. Once cool, the reinforced gel substrates may be removed from the trays.

The use of both the GELRITE™ and the Chitosan provides, for example, additional rigidity and stability to the substrate. The additional rigidity may, for example, allow the wire mesh to maintain position with respect to the gel as the substrate is moved or otherwise repositioned. The additional stability may allow the substrate to avoid excessive decomposition over a period. The period is 1 week in some embodiments, several weeks in some embodiments, and over the course of growth of a plant from seeding to harvest in some embodiments.

The activated charcoal may be used to decrease passage of light through the gel to roots of the plants. In addition, use of the activated charcoal appears to increase penetration of roots of the plant into the gel, instead of for example the roots extending along a surface of the gel. For example, it appears that for seeds germinated on or near a surface of the gel, roots formed after germination are more likely to grow into the gel, as opposed to extending along a surface of the gel.

In some embodiments the gel with the activated charcoal may be placed on a fabric panel, with seeds placed on the fabric, in the gel, or on the gel. In some embodiments the fabric may be held relatively taught by a frame at edges of the fabric panel. In some embodiments the seeded gel-coated fabric panel may be held horizontally during seed germination, in some embodiments the seeded gel-coated fabric panel may be held vertically during seed germination. In some embodiments plant growth, in some embodiments through harvest, may occur with the panel in the horizontal position. In some embodiments the plant growth may occur with the panel in the vertical position.

Seeds for growing of the plants may be placed in cavities extending into the gel from a top surface of the substrate. The cavities may, for example, have a depth of one-eight of an inch. Alternatively, in some embodiments the surface of the substrate may be roughened, for example using a wire brush, with the seeds placed in crevices or scratches formed by the roughening. In some embodiments the seeds may be simply deposited on the surface of the substrate. For all of these cases, in some embodiments the seeds are placed on or in the gel prior to substantial hardening of the gel, and in some embodiment the seeds are placed on or in the gel after hardening of the gel. In some embodiments the seeds are allowed to germinate prior to changing orientation of the substrate, with respect to the horizontal plane. For example, in some embodiments the substrate has seeds on or about a top planar surface of the substrate, and the substrate is positioned with the top planar surface in a substantially horizontal plane for germination of the seeds. In some embodiments the plants may be grown, to harvest in some embodiments, with the top planar surface in the substantially horizontal plane. In some embodiments the top planar surface may be moved from the horizontal plane to a vertical plane for further growth of the plants. In other embodiments, particularly embodiments in which the seeds are placed on or in the gel prior to substantial hardening of the gel, the substrate may have its orientation changed prior to germination of the seeds. For example, in some embodiments the substrate has seeds on or about a top planar surface of the substrate, and the substrate is positioned with the top planar surface in a substantially vertical plane for germination of the seeds. In some embodiments the top planar surface may be maintained in the vertical plane for subsequent growth of the plants.

Figure 2:
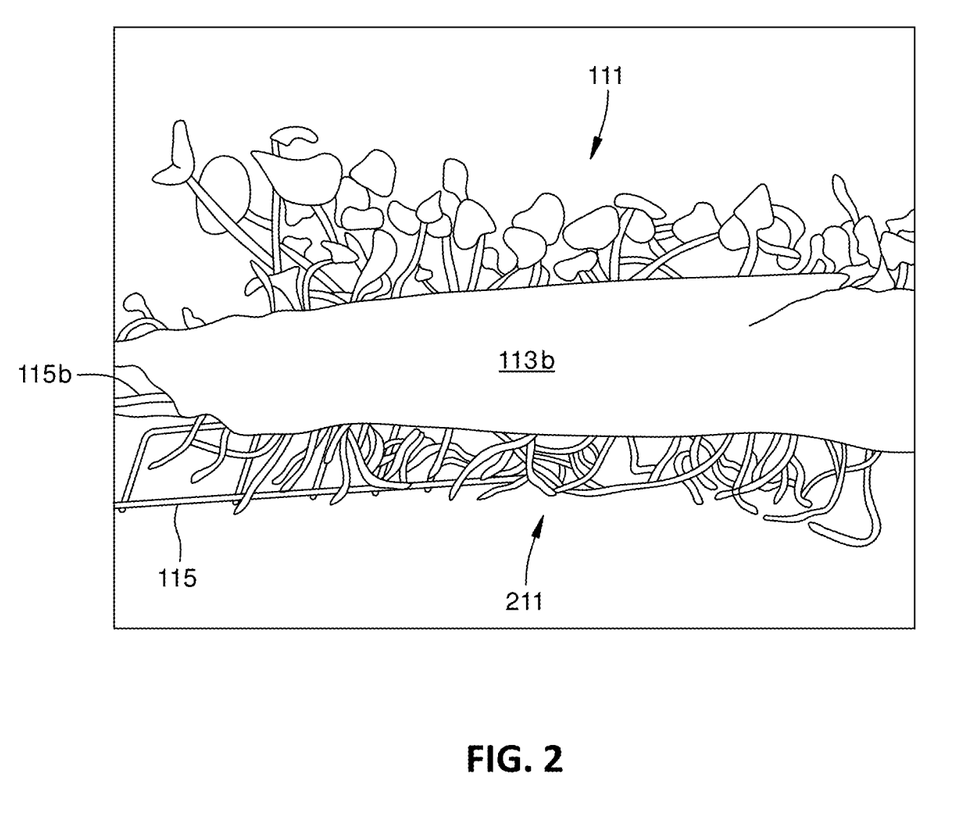
FIG. 2 shows a side view of the plants growing in the substrate of FIG. 1.

FIG. 2 shows a side view of the plants 111 growing in the substrate of FIG. 1. As illustrated in FIG. 2, the side 113b of the substrate is visible, with the side generally comprising the gel. The plants have a canopy extending above the substrate. Roots 211 of the plants may be seen extending out of the bottom of the substrate.

As with FIG. 1, a portion of a wire mesh 115 may be seen extending below a surface of gel of the substrate, and a wire 115b of the wire mesh may also be seen exposed in the gel. In general, the wire mesh extends in a planar manner within the gel. The portion of the wire mesh extending out below the bottom of the substrate (or above the top in some embodiments) may be useful in providing an offset to allow the body of the mesh to sit off a bottom of a tray during fabrications, as well as provide a handle-like feature for manipulation of position of the substrate.

Figure 3:
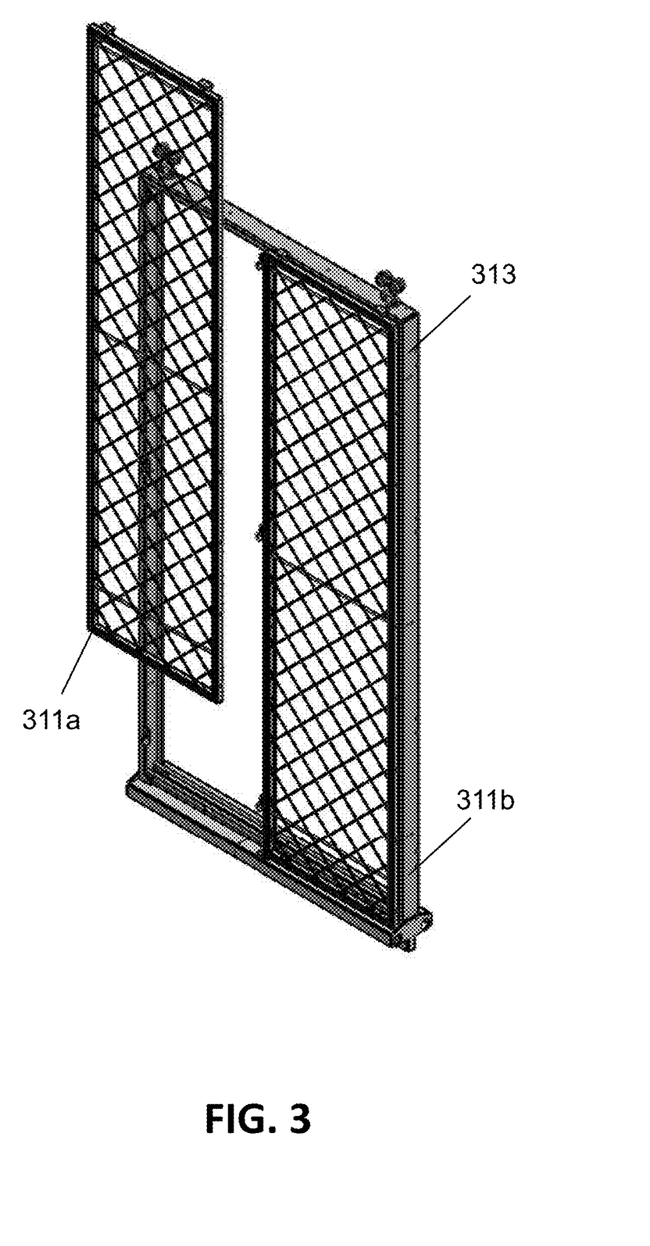
FIG. 3 is a perspective view of a wire frame assembly, without the gel, in accordance with aspects of the invention.

FIG. 3 is a perspective view of an embodiment of wire frame assembly, without the gel of the substrate, in accordance with aspects of the invention. The wire frame assembly of FIG. 3 includes a first wire mesh 311a and a second wire mesh 311b. The first wire mesh and the second wire mesh are shown as being generally planar rectangles in shape.

In some embodiments the mesh has openings between 0.26 inches (0.66 cm) and 3.12 inches (7.93 cm), inclusive, in at least two perpendicular directions. In some embodiments the mesh is a wire mesh. In some embodiments the mesh includes openings between 4 and 50 times a width of wires in the mesh. In some embodiments the wire mesh includes a space between wires of 0.26 inches (0.66 cm) and 3.12 inches (7.93 cm), inclusive. In some embodiments the mesh is comprised of a metal. In some embodiments the mesh is comprised of a plastic. In some embodiments the substrate is substantially planar. In some embodiments the substrate has depth of between 0.5 inches (1.27 cm) and 3 inches (and 7.62 cm). In some embodiments the mesh comprises plastic-coated wire.

The first wire mesh is shown positioned outside a frame 313. The second wire mesh is shown positioned in the frame, on a front right side of the frame as viewed in FIG. 3. The frame also substantially rectangular in shape, and is dimensioned to hold the wire meshes side-by-side. For example, the first wire mesh may be positioned on a front left side of the frame. In many embodiments the frame may hold wire meshes both on the front side and a rear side.

Figure 4:
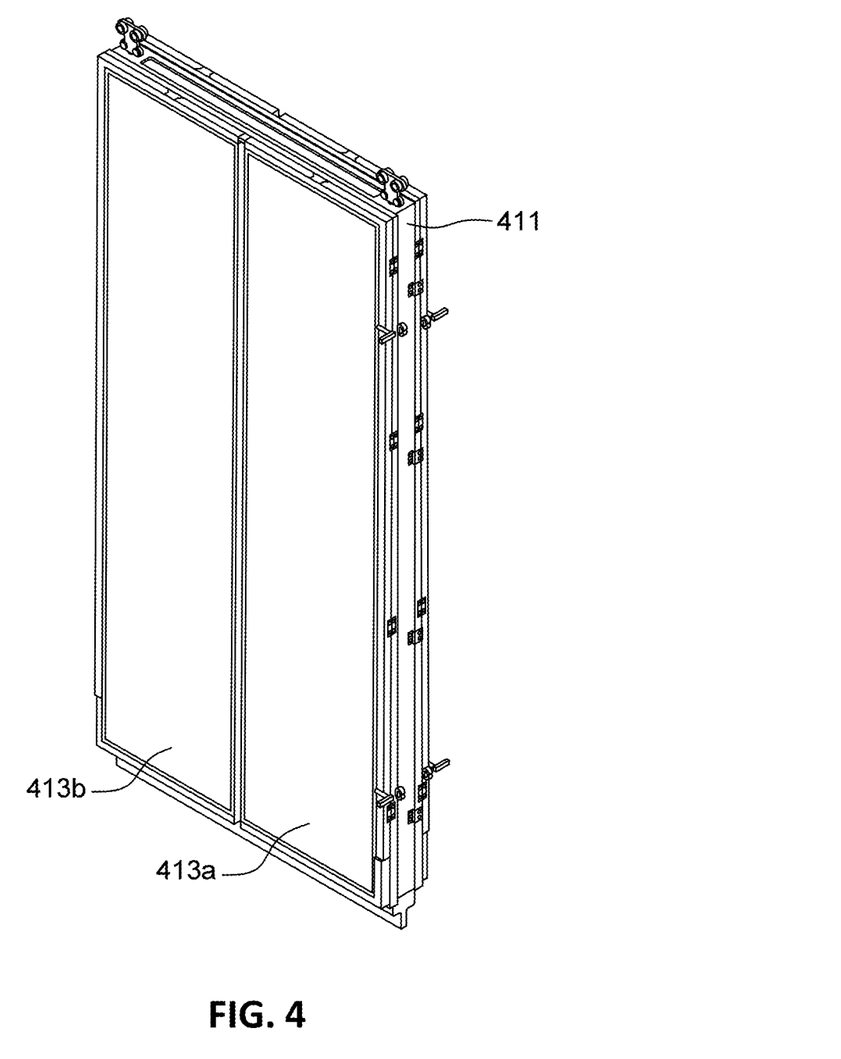
FIG. 4 is a perspective view of the wire frame assembly with the gel, in accordance with aspects of the invention.

FIG. 4 is a perspective view of a wire frame assembly loaded with gel, so as to form a reinforced gel substrate in accordance with aspects of the invention. The assembly includes a frame 411, shown as substantially rectangular in FIG. 4. The frame carries four reinforced gel substrates, of which only two are visible in FIG. 4. The substrates comprise a gel on a wire or mesh scaffolding, for example the scaffolding of FIG. 3. The two visible substrates are a first substrate 413a and a second substrate 413b, both substantially rectangular in form in the example of FIG. 4. The first substrate and the second substrate are carried side-by-side by the frame, with the first substrate shown as being on a front right side of the frame and the second substrate shown as being on a front left side of the frame. The remaining two substrates are similarly mounted on a rear of the frame. When mounted on the frame, there is a gap between the front substrates and the rear substrates. The frame and the substrates therefore define an interior volume.

In most embodiments seeds may be planted on or near surfaces of the substrates that are away from the interior volume. Piping (not shown) may provide liquid, for example in the form of a mist, in the interior of the volume. The frame and substrates may therefore provide a grow wall for an aeroponic plant growth system.

Figure 5:
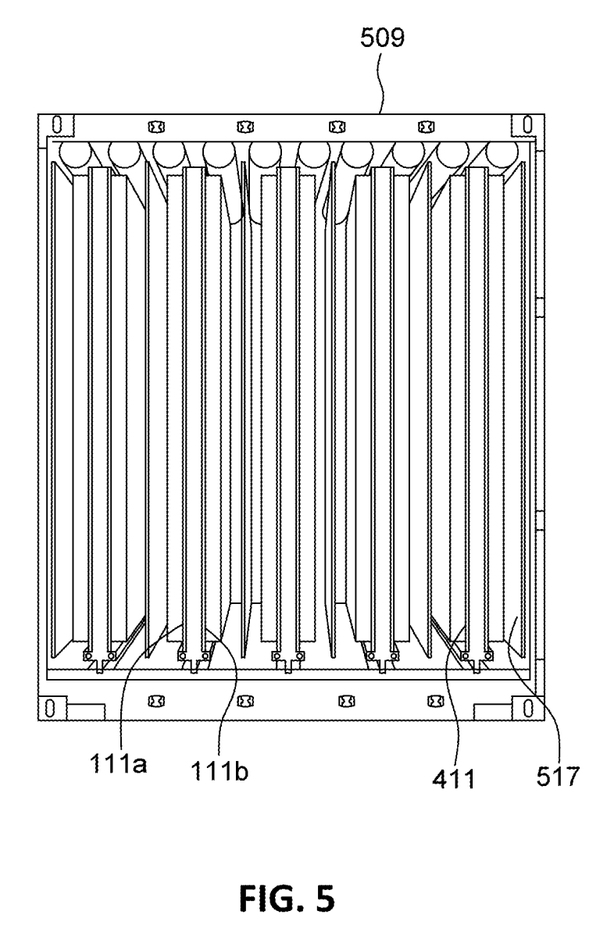
FIG. 5 is a front view of a grow chamber for an aeroponic plant growth system, in accordance with aspects of the invention.

FIG. 5 is a front view of a grow chamber for an aeroponic plant growth system, in accordance with aspects of the invention. The grow chamber is housed by a container 509. The container may have the general size and shape of a shipping container, for example. A plurality of frames, for example 411, may be arranged in parallel lines within the container. In FIG. 5 the frames are shown as double-sided, with substrates growing plants 111a,b on each side of the frames. In some embodiments, however, the frames may only include substrates on one side, with an opposing side of the frame enclosed by something other than a substrate. The substrates and frames provide grow walls within the container. A mist environment may be provided within the grow walls in some embodiments. In some embodiments, however, the substrates may provide sufficient water and nutrients to allow for plant growth. Lights to allow for photosynthesis, for example lights 517, provide light to canopies of plants growing on each substrate.

Figure 6A:
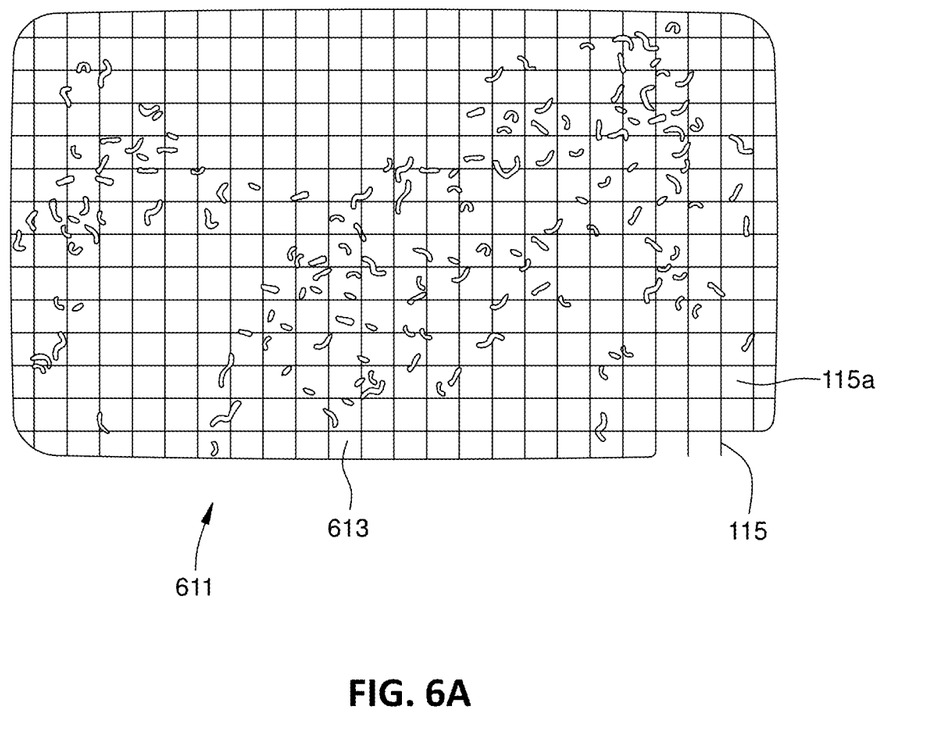
FIG. 6A is a top view of a further reinforced gel substrate with plant growth, in accordance with aspects of the invention.

FIG. 6A is a top view of a further reinforced gel substrate with plant growth, in accordance with aspects of the invention. The further substrate is substantially planar, with plants 611 growing out of a top of the substrate. The substrate includes a gel material 613 supported by a wire mesh scaffold 115. The wire mesh scaffold includes wires within the gel material, for example wire 115a. The gel material includes activated charcoal, for example as discussed above. The activated charcoal serves to reduce transmission of light into and through the substrate, for example to assist in avoiding deleterious impacts to roots of the plants. In addition, it has been found that inclusion of the activated charcoal in the gel material appears to increase penetration of roots of the plants into the gel material, as opposed to growth of the roots along an upper surface of the gel material.

Figure 6B:
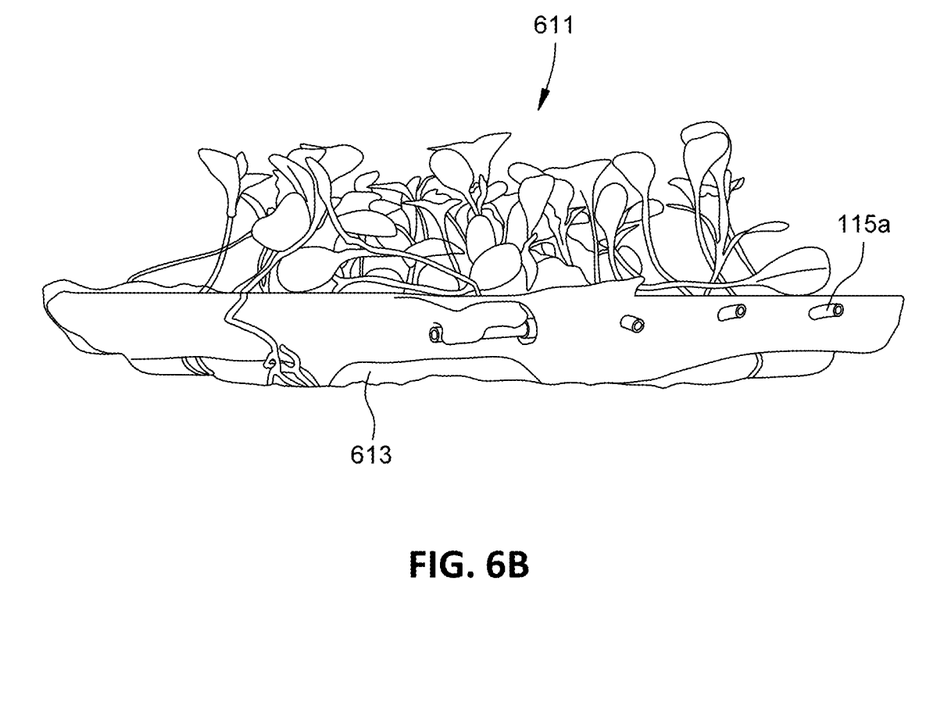
FIG. 6B is a side view of a further reinforced gel substrate with plant growth, in accordance with aspects of the invention.

FIG. 6B is a side view of a further reinforced gel substrate with plant growth, in accordance with aspects of the invention. As with FIG. 6A, the further substrate is substantially planar, with plants 611 growing out of a top of the substrate. Also, as with FIG. 6A, the gel material 613 of the substrate of FIG. 6B includes activated charcoal. For the side view of FIG. 6B, wires, for example wire 115a of the wire mesh providing reinforcement for the gel, may be seen extending into a body of the substrate, with wires inside the body encapsulated by the gel material.

Figure 7:
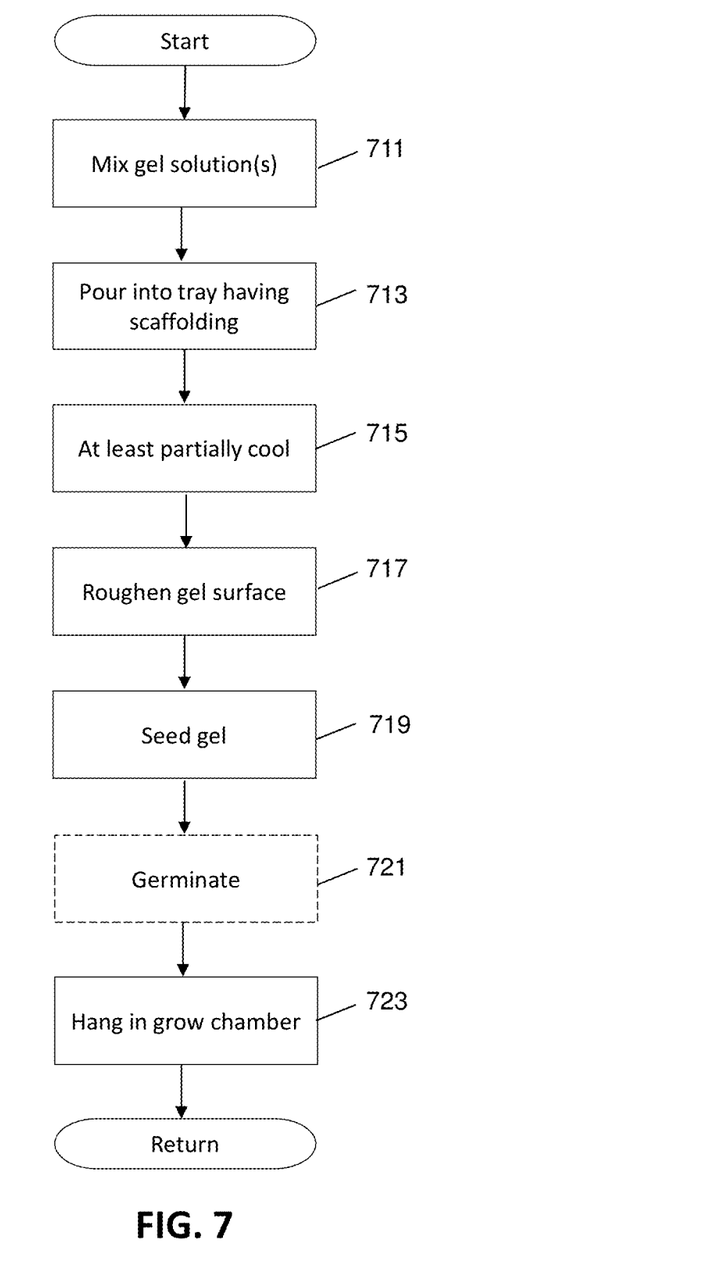
FIG. 7 is a flowchart of an example process for utilizing a reinforced gel substrate for plant growth, in accordance with aspects of the invention.

FIG. 7 is a flowchart of an example process for utilizing a substrate for plant growth, in accordance with aspects of the invention. In some embodiments the substrate includes a gel with a mesh or wire scaffolding. In some embodiments the gel substantially encapsulates the mesh or wire scaffolding. In some embodiments the substrate is a substrate as discussed herein. In some embodiments the gel is a gel as discussed herein. In some embodiments the mesh or wire scaffolding is a mesh or wire scaffolding as discussed herein.

In block 711 the gel solution or gel solutions are mixed. In some embodiments the gel solution(s) include a first polysaccharide and a second polysaccharide. In some embodiments the gel solutions include a gellan gum. In some embodiments the gel solutions include chitosan. Some embodiments the gel solutions include carbon, in some embodiments activated charcoal. In some embodiments the gel solution(s) are as discussed herein.

In block 713 the mixed gel solution(s) are poured into a tray. In some embodiments the tray has a wire mesh within the tray. In some embodiments the wire mesh is placed into the tray after pouring of the gel solutions(s) begins, but before pouring of the gel solution(s) is complete. In some embodiments the wire mesh is placed into the tray after pouring of the gel solution(s) is complete. In some embodiments the wire mesh includes opposing ends bent normal to a plane defined by a body of the wire mesh. In some embodiments the opposing ends form a spacer to keep the body of the wire mesh offset from a bottom of the tray. In some embodiments the opposing ends form a handle to assist in withdrawal of the substrate from the tray.

In block 715 the gel solution(s) in the tray are allowed to at least partially cool. In some embodiments the gel solution(s) are allowed to cool a sufficient amount that the gel solution(s) at least partially gels. In some embodiments the gel solution(s) are allowed to cool a sufficient amount that the gel solution(s) gels.

In block 717 the gel surface is roughened. In some embodiments the gel surface is roughened by application of wires of a wire brush to a gel surface. In some embodiments the gel surface is roughened by forming indentations or cavities in the gel surface. In some embodiments the substrate, of which the gel is a part, is removed from the tray prior to roughening of the gel surface. In some embodiments the substrate is removed from the tray after roughening of the gel. In some embodiments the surface of the gel that is roughened is a surface of the gel that was in contact with a bottom of the tray. In some embodiments the roughening is sufficient to allow seeds placed on the surface of the gel to at least partially rest below a surface level of the gel prior to roughening. In some embodiment the roughening is sufficient to provide creases in the surface of the gel for the seeds to sit in.

In block 719 the substrate is seeded with plant seeds. In some embodiments the substrate is seeded by placing the seed on the gel of the substrate. In some embodiments the substrate is seeded by placing the seeds on the roughened surface of the substrate. In some embodiments the substrate is seeded with the roughened surface of the substrate in a generally horizontal plane.

In block 721 the seeds are allowed to germinate. In some embodiments the seeds are allowed to germinate with the roughened surface of the substrate in a generally horizontal plane. In some embodiments, however, operations of block 721 occur after operations of block 723, in which the roughened surface of the substrate is translated to a generally vertical plane.

In block 723 the substrate is hung in a grow chamber for growth of the plants. In some embodiments the substrate is hung on a frame, for example a frame discussed herein. In some embodiments the substrate is hung in a grow container, for example as discussed herein. In some embodiments the grow container is a grow container for aeroponic growth of plants. In some embodiments the substrate forms part of a grow wall for an aeroponic plant growth system.

The process thereafter returns. In some embodiments, however, the plants are harvested and the gel of the reinforced gel substrate recycled for further use. In some such embodiments the reinforced gel substrate may have liquid, for example water, applied to the substrate, with the liquid sufficiently warmed to wash the gel off the wire mesh. The resulting effluent may be filtered with a first filter to separate plant material, primarily root balls and possibly stems, from the gel material, and filtered with a second filter to separate the gel material and the liquid. The separated gel material may then be heated and used as a mixture for forming a further reinforced gel substrate.

Although the invention has been discussed with respect to various embodiments, it should be recognized that the invention comprises the novel and non-obvious claims supported by this disclosure.

What is claimed is:

1. A plant growth medium held vertically, comprising:
   a vertically arranged substrate comprising a gel and a scaffolding for the gel, the substrate having a top surface and a bottom surface when held horizontally;
   the gel comprising 0.2% to 3% gellan gum by weight and 0.0007% to 0.3% chitosan by weight; and
   the scaffolding at least partially encapsulated in the gel and positioned about mid-way between the top surface and bottom surface of the substrate.

2. The plant growth medium of claim 1, wherein the substrate is in a form of a planar slab.

3. The plant growth medium of claim 2, wherein the scaffolding includes a wire frame assembly comprising a first wire mesh and a second wire mesh so as to form rectangular openings.

4. The plant growth medium of claim 3, wherein the wire mesh includes openings between 4 and 50 times a width of wires in the mesh.

5. The plant growth medium of claim 3, wherein the wire mesh includes a space between wires of 0.26 inches (0.66 cm) and 3.12 inches (7.93 cm).

6. The plant growth medium of claim 2, wherein the mesh is comprised of metal.

7. The plant growth medium of claim 2, wherein the mesh is comprised of plastic.

8. The plant growth medium of claim 2, wherein the mesh is comprised of a synthetic material.

9. The plant growth medium of claim 2, wherein the mesh is comprised of plastic-coated wire.

10. The plant growth medium of claim 2, further comprising plant seeds approximately ⅛ inch from a first planar surface of the planar slab.

11. The plant growth medium of claim 1, wherein the gel further comprises activated charcoal.

12. The plant growth medium of claim 1, wherein the vertical substrate has a length between 5 feet and 9 feet and a width of between 29 inches and 7 feet.

13. The plant growth medium of claim 1, wherein the gel further comprises an acidic fertigation solution having a conductivity between 1.0 and 1.4 millisiemens/centimeter.

14. The plant growth medium of claim 1, wherein the gel further comprises, sodium nitrate, potassium, copper, zinc, manganese, iron, boron, calcium, magnesium, or any combination thereof.

* * * * *